(12) United States Patent
Kim

(10) Patent No.: US 12,361,737 B2
(45) Date of Patent: Jul. 15, 2025

(54) METHOD OF RECOGNIZING MAGNETIC INK CHARACTERS IN ATM

(71) Applicant: Hyosung TNS Inc., Seoul (KR)

(72) Inventor: Hyun Su Kim, Seoul (KR)

(73) Assignee: Hyosung TNS Inc., Seoul (KR)

( * ) Notice: Subject to any disclaimer, the term of this patent is extended or adjusted under 35 U.S.C. 154(b) by 272 days.

(21) Appl. No.: 17/901,709

(22) Filed: Sep. 1, 2022

(65) Prior Publication Data

US 2023/0368554 A1 Nov. 16, 2023

(30) Foreign Application Priority Data

May 10, 2022 (KR) .......................... 10-2022-0057443

(51) Int. Cl.
*G06V 30/224* (2022.01)
*G06Q 20/10* (2012.01)

(52) U.S. Cl.
CPC ..... *G06V 30/2253* (2022.01); *G06Q 20/1085* (2013.01)

(58) Field of Classification Search
CPC .................. G06V 30/2253; G06Q 20/1085
See application file for complete search history.

(56) References Cited

U.S. PATENT DOCUMENTS

| | | | |
|---|---|---|---|
| 2004/0217170 A1* | 11/2004 | Takiguchi | .............. G06K 7/084 235/449 |
| 2010/0074510 A1* | 3/2010 | Lee | .................... G06V 30/2253 382/139 |
| 2015/0332128 A1 | 11/2015 | Sadovsky et al. | |
| 2017/0309108 A1* | 10/2017 | Sadovsky | .......... G06V 30/2253 |

FOREIGN PATENT DOCUMENTS

| | | |
|---|---|---|
| KR | 10-0893613 B1 | 4/2009 |
| KR | 10-1321212 B1 | 10/2013 |

* cited by examiner

*Primary Examiner* — Edward Park
(74) *Attorney, Agent, or Firm* — WTA Patents

(57) ABSTRACT

Recognizing magnetic ink characters in an automated teller machine and, more particularly, recognizing magnetic ink characters in an automated teller machine. Results of optical character recognition (OCR) are compared based on an image acquired through a contact image sensor (CIS) provided in an authentication unit and character-based waveforms of magnetic ink characters acquired through an MR sensor. Whether a bill is legitimate is authenticated, and thus correct reading of magnetic ink characters printed on a check is realized. The structure of the authentication unit can be simplified so that correct recognition of the magnetic ink characters printed on the check in a normal automated teller machine is supported without a high-resolution MICR sensor, and the cost of manufacturing the automated teller machine can be effectively reduced.

6 Claims, 4 Drawing Sheets

METHOD OF RECOGNIZING MAGNETIC INK CHARACTERS IN ATM

CROSS-REFERENCE TO RELATED APPLICATIONS

This application claims priority to Republic of Korea Patent Application No. 10-2022-0057443, filed on May 10, 2022, which is incorporated by reference herein in its entirety.

TECHNICAL FIELD

The present disclosure relates to a method of recognizing magnetic ink characters in an automated teller machine. More particularly, the present disclosure relates to a method of recognizing magnetic ink characters in an automated teller machine, the method being capable of comparing, for verification, results of optical character recognition (OCR) on the basis of an image acquired through a contact image sensor (CIS) provided in an authentication unit and character-based waveforms of magnetic ink characters that are acquired through an MR sensor provided in order to authenticate whether a bill is legitimate and thus of realizing correct reading of magnetic ink characters printed on a check while an automated teller machine handling both a bill and a check reads the magnetic ink characters printed on the check inserted thereinto. With this method, a structure of the authentication unit can be simplified in such a manner that correct recognition of the magnetic ink characters printed on the check in a normal automated teller machine is supported without a high-resolution MICR sensor required to be provided in the normal authentication unit in order to read the magnetic ink characters printed on the check. Moreover, the cost of manufacturing the automated teller machine can be effectively reduced.

BACKGROUND ART

A banking institution has installed an automated teller machine (ATM) inside or outside its branch, in a shopping mall, or the like and serves to provide a customer with services for various financial transactions without restriction on time and location. The ATM not only provides banking services, such as cash deposit, cash withdrawal, remittance, and payment of utility bills, but also, depending on the situation, performs functions for check deposit, check withdrawal, and the like.

To this end, the ATM includes an authentication unit for authenticating respective face amounts of a check and a bill that are deposited into and withdrawn from the ATM, whether or not the check and bill are legitimate, whether or not the check and bill are damaged, and the like. The authentication unit includes a contact image sensor for acquiring an image of the bill, a thickness sensing sensor and/or an ultrasonic sensor for checking whether or not two bills are transferred as one bill, an MR sensor for authenticating whether or the bill is legitimate, and the like. With this configuration, the authentication unit is configured to authenticate the bill that is inserted into the automated teller machine.

In addition, in recent years, as described above, the ATM has been introduced that handles a bill and a check at the same time. Thus, various sensor modules for authenticating the check are mounted in the ATM. In order to authenticate the check, as described above, it is very important that operations, such as an operation of acquiring the image through the contact image sensor, are properly performed and that magnetic ink characters printed on one side of the check are correctly recognized.

Accordingly, in Korean Patent No. 10-1112445 that is one related art document, the authentication unit includes a magnetic ink character recognition sensor (MICR) sensor configured to magnetize magnetic ink printed on a surface of a check and recognize information of the magnetized magnetic ink and to derive a high-resolution magnetic sensing value (waveform) is mounted in. Thus, the MICR sensor serves to correctly read magnetic ink characters printed on the inserted check.

SUMMARY

An object of the present disclosure, which, as described above, is contrived to simplify more effectively a configuration of an authentication unit provided in an automated teller machine handling both a bill and a check, is to compare, for verification, results of optical character recognition on the basis of an image acquired through a contact image sensor provided in the authentication unit and character-based waveforms of magnetic ink characters that are acquired through an MR sensor provided in order to authenticate whether a bill is legitimate and thus to realize correct reading of magnetic ink characters printed on a check while an automated teller machine handling both a bill and a check reads the magnetic ink characters printed on the check inserted thereinto. With this method, a structure of the authentication unit is simplified in such a manner that correct recognition of the magnetic ink characters printed on the check in a normal automated teller machine is supported without a high-resolution MICR sensor required to be provided in the normal authentication unit in order to read the magnetic ink characters printed on the check. Moreover, the cost of manufacturing the automated teller machine is effectively reduced.

In order to accomplish the above-mentioned object, according to an aspect of the present disclosure, there is provided a method of recognizing magnetic ink characters in an automated teller machine, the method being a method of recognizing magnetic ink characters printed on a check inserted into an automated teller machine handling both a bill and a check, and the method including: deriving results of recognizing magnetic ink characters by applying a waveform authentication algorithm to be executed by a microprocessor of an automated teller machine, on the basis of an image of a check that is acquired through a contact image sensor provided in an authentication unit of the automated teller machine in order to acquire an image of a bill and character-based waveforms of the magnetic ink characters acquired from an MR sensor provided in the authentication unit of the automated teller machine in order to authenticate whether or not the bill is legitimate; and acquiring the image of the check through the contact image sensor, comparing, for verification, results of optical character recognition (OCR) that are derived by performing OCR processing on the acquired image of the check and results of waveform authentication that are derived by applying the waveform authentication algorithm to the character-based waveforms, and thus recognizing the magnetic ink characters printed on one side of the check.

In a method of recognizing magnetic ink characters according to the present disclosure, in recognizing magnetic ink characters printed on a check, both an MR sensor and a contact image sensor that are usually provided in an authentication unit in order to authenticate whether or not a bill is legitimate are used. Accordingly, results of optical character recognition (OCR) on the basis of an image of a check that is acquired through the contact image sensor, and character-based waveforms of the magnetic ink characters that are acquired through the MR sensor are compared for verification, and thus the magnetic ink characters printed on the check are read. Therefore, with this method, the magnetic ink characters printed on the check are correctly recognized without a high-resolution MICR sensor required to be provided in the authentication unit in order to read the magnetic ink characters printed on the check in a normal automated teller machine. Thus, the advantage of maintaining the reliability of results of check authentication is provided.

An automated teller machine to which the method of recognizing magnetic ink characters according to the present disclosure is applied includes the authentication unit that is configured not to include the MICR sensor that is configured to include various constituent elements, such as a head unit and a magnetization unit. Thus, the advantage of simplifying a configuration of the authentication unit and thus reducing the cost of manufacturing the ATM is provided.

DETAILED DESCRIPTION OF EMBODIMENTS

Various modifications can be made to the present disclosure, and the present disclosure can be practiced in various forms. In the present specification, specific embodiments of the present disclosure will be described in detail with reference to the drawings.

However, the present disclosure is not intended to be limited to specific forms for disclosure. All alterations, equivalents, and substitutes that are included within the technical idea of the present disclosure should be understood as falling within the scope of the present disclosure. The terms first, second, and so on may be used to describe various constituent elements, but should not be construed to impose any limitation on the meanings of the constituent elements. These terms are used only for the purpose of distinguishing from one constituent element to another. For example, a first constituent element may be named a second constituent element. Similarly, the second constituent element may also be named the first constituent element.

The terms used in the present application are only for describing the specific embodiments of the present disclosure and are not intended to impose any limitation on the present disclosure. A noun in singular form has the same meaning as when used in plural form, unless it has a different meaning in context. It should be understood that, in the present application, the terms "include," "have," and the like are intended to indicate that a feature, a number, a step, an operation, a constituent element, a component, or a combination thereof is present without precluding the possible presence or addition of one or more other features, numbers, steps, operations, constituent elements, components, or combinations thereof.

Embodiments of the present disclosure will be described in detail below with reference to the drawings and, as long as they depart from the gist of the present disclosure, do not impose any limitation on the present disclosure.

Figure 1:
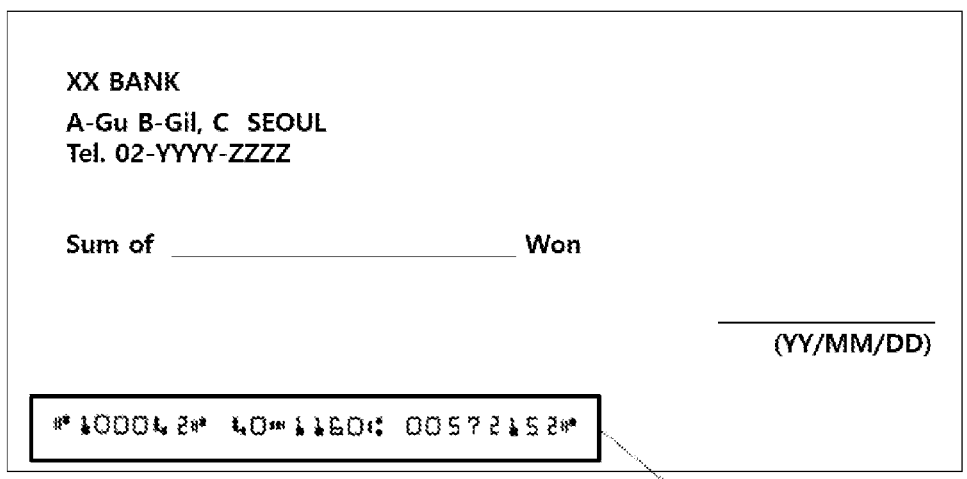
FIG. 1 is a view illustrating an image of a check on which magnetic ink characters are printed.

FIG. 1 is a view illustrating an image of a check on which magnetic ink characters are printed.

As illustrated in FIG. 1, the magnetic ink characters including a series of numbers and a symbol are printed on one side of the check in circulation in financial transactions. The magnetic ink characters are printed in ink having a magnetic property. An authentication unit of an automated teller machine is configured to recognize the magnetic ink characters and thus to detect authentication information, such as information on whether or not the check is counterfeited and information on whether or not the check is faked, as well as identification information of the check.

In order to authenticate respective face amounts of a check and a bill that are deposited into and withdrawn from the automated teller machine, whether or not the check and the bill are legitimate, whether or not the check and the bill are damaged, and so on, the authentication unit here of the automated teller machine, as described above, includes a contact image sensor (CIS) for acquiring an image of a bill, a thickness sensing sensor for authenticating whether or not a foreign material is attached to the bill or whether or not two bills are transferred as one bill, an MR sensor for determining whether or the bill is legitimate, and the like. With this configuration, the authentication unit is configured to authenticate the bill that is inserted into the automated teller machine. Moreover, in order to correctly recognize the magnetic ink characters, a magnetic link character recognition (MICR) sensor that outputs a high-resolution magnetic sensing value (a waveform) is additionally mounted in the authentication unit of the automated teller machine that handles both the bill and the check.

The MICR sensor here that is mounted in the authentication unit magnetizes magnetic ink, may recognize information of the magnetized magnetic ink, derive a high-resolution magnetic sensing value, and output, at high resolution, character-based waveforms of the magnetic ink characters printed on the check. Thus, the MICR sensor may correctly read each of the magnetic ink characters.

In recent years, with development of semiconductor micro process technology, resolution of the contact image sensor has been increased. Accordingly, the image of the check is acquired by utilizing the contact image sensor provided in the authentication unit of the automated teller machine in order to authenticate whether or not the bill is legitimate. Then, the magnetic ink character printed on the check is read on the basis of the acquired image, through an optical character recognition (OCR) technique. Therefore, an environment where the magnetic ink characters printed on the check are possibly recognized without separately using the separate MICR sensor has been created.

However, in a case where the magnetic ink characters printed on the check are read through the OCR technique, using only the contact image sensor, when the OCR technique is used, the magnetic ink characters are read on the basis of only a shape of each of the individual magnetic ink characters. For this reason, a counterfeit check in which a string of characters is replicated or common ink is used instead of the magnetic ink, a damaged check in which a magnetic character that constitute a string of magnetic ink characters is partially damaged, or the like may be erroneously recognized and handled as a legitimate check. Accordingly, there is a concern that the reliability of results of the authentication of the check by the automated teller machine will be decreased.

In order to remove this concern, according to the present disclosure, there is provided a method of correctly reading the magnetic ink characters printed on the check. In the method, results of OCR and the character-based waveforms of the magnetic ink characters are compared for verification. The results of the OCR are derived by performing optical character recognition processing on the basis of the image of the check that is acquired through the contact image sensor. The character-based waveforms of the magnetic ink characters are acquired through the MR sensor provided in the authentication unit of the automated teller machine in the related art in order to authenticate whether or not the inserted bill is legitimate.

Figure 2:
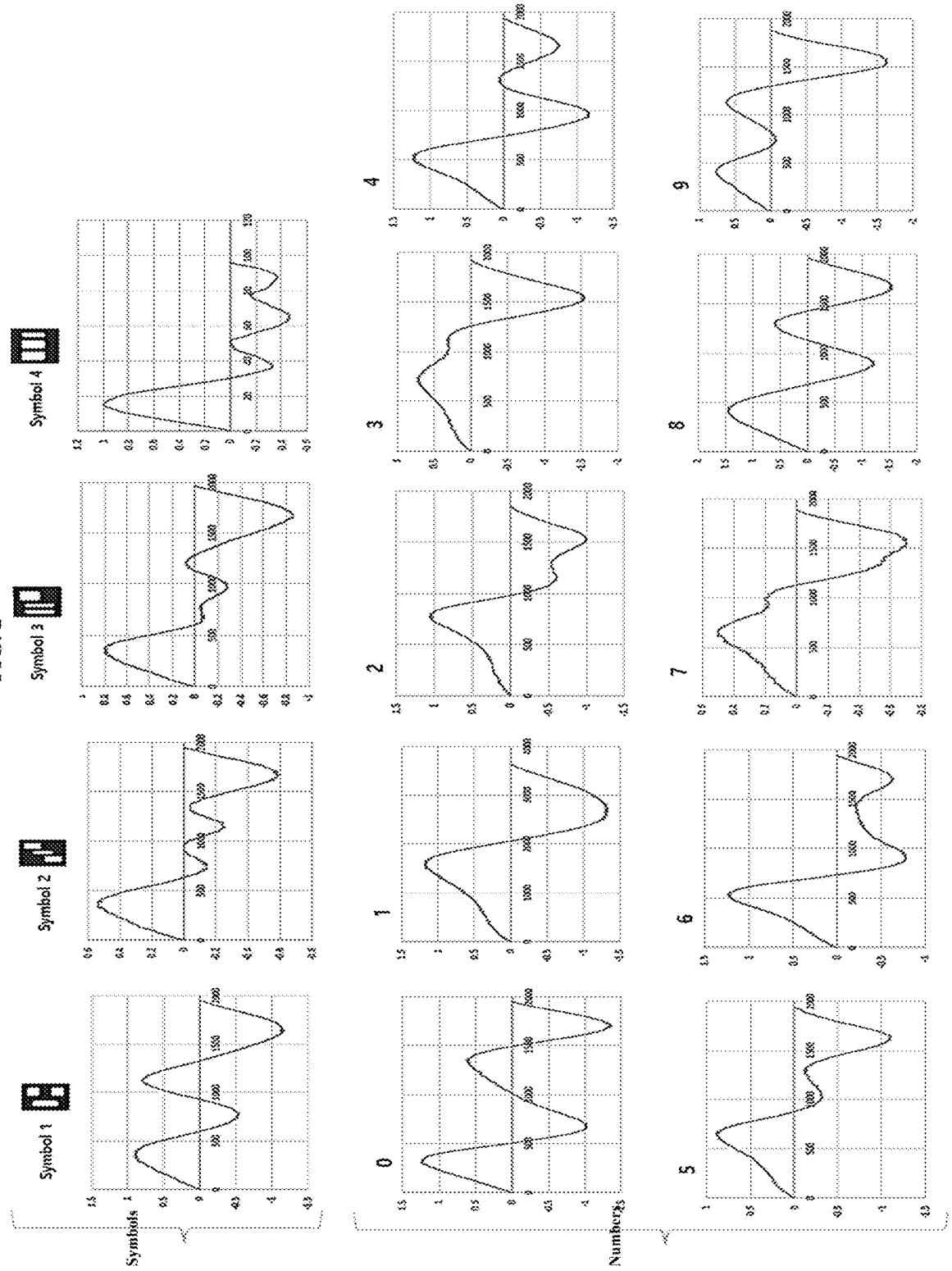
FIG. 2 is graphs illustrating examples of character-based waveforms of magnetic ink characters that are acquired through an MICR sensor in the related art.
Figure 3:
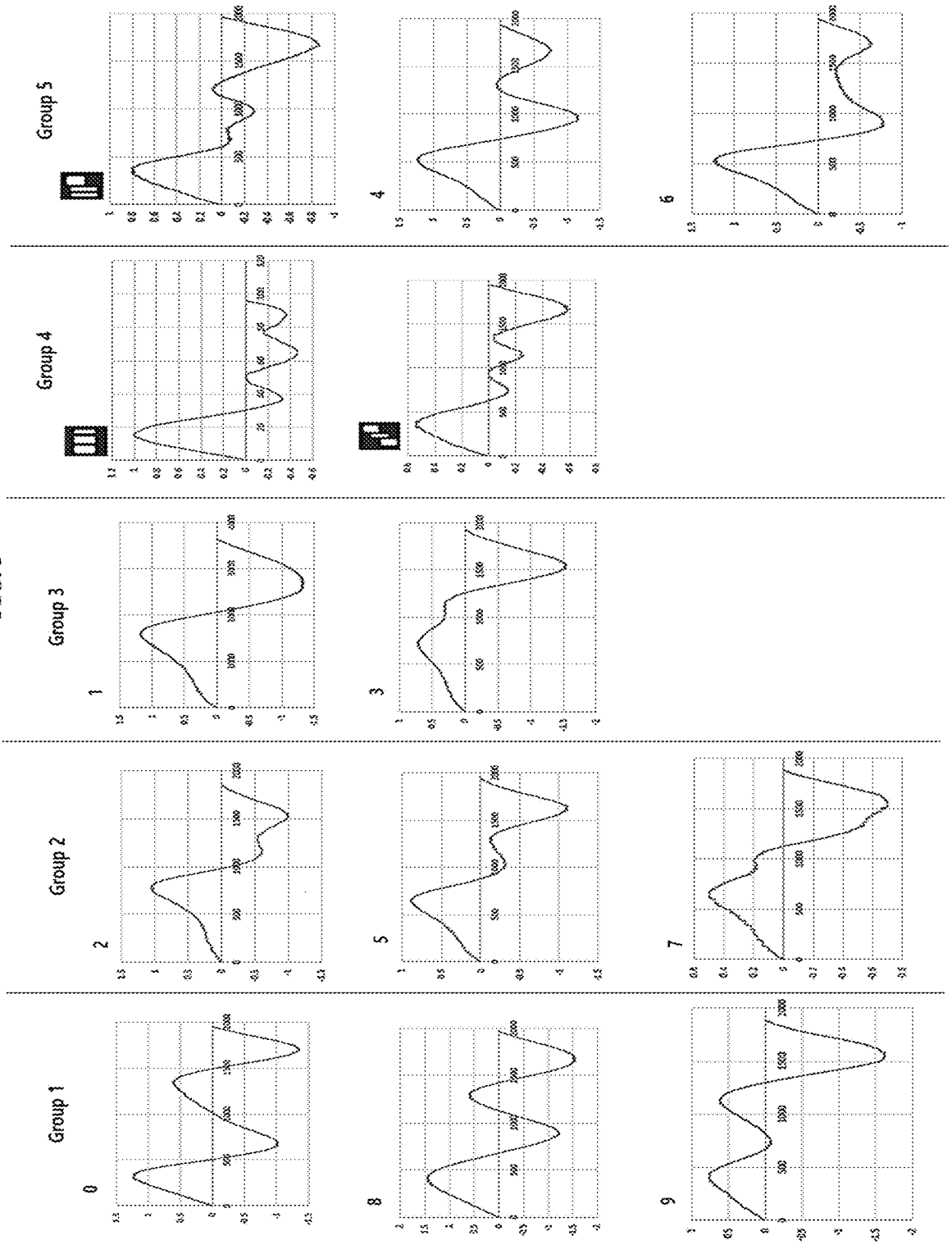
FIG. 3 is graphs illustrating a case where, according to a first embodiment of the present disclosure, the magnetic ink characters printed on the check are grouped by similarity in waveform.

FIG. 2 is graphs illustrating examples of the character-based waveforms of the magnetic ink characters that are acquired through the MICR sensor in the related art. FIG. 3 is graphs illustrating a case where, according to a first embodiment of the present disclosure, the magnetic ink characters printed on the check are grouped by similarity in waveform.

The magnetic ink characters are printed, in special ink (magnetic ink) containing a magnetic material, on one side of the check. Normally, two fonts, that is, E13B and CMC7, which are established as the international standard by the International Organization for Standardization (ISO), are most commonly used as fonts of the magnetic ink characters.

In the first embodiment that is described above with reference to FIGS. 2 and 3, as an example, the magnetic ink characters are printed in the E13B font, but the present disclosure is not necessarily limited to this font. Of course, in a similar manner, the present disclosure may also find application in recognizing the magnetic ink characters printed in the CMC7 font.

The E13B font, one of the fonts of the magnetic ink characters, is mostly used in North America and Asia including Republic of Korea. In FIG. 2, character-based waveforms in the E13B font are illustrated. Ten numbers from "0" to "9," and four symbols are printed in the E13B font.

In this case, as illustrated in FIG. 2, the character-based waveforms of the magnetic ink characters that are acquired through the MICR sensor may be categorized by similarity in waveform that varies with various waveform factors, such as the number of peaks in the waveform, a position of the peak, and a distance between the peaks. Results of categorizing the character-based waveforms of the characters by similarity in waveform are shown in FIG. 3.

That is, as illustrated in FIG. 3, from close-up view of the waveforms of the characters that are categorized into the same group, it can be understood that the characters are categorized into different five similarity waveform groups by substantial similarity in the number of peaks, the position of the peak, the distance between the peaks, and the like.

The reason for categorizing the waveforms of the characters into the similarity waveform groups is to compensate for relatively low resolution of the MR sensor provided in the authentication unit of the ordinary automated teller machine in order to authenticate whether or not the bill is legitimate. Usually, the MR sensor provided in the authentication unit in order to authenticate whether or not the bill is legitimate has lower resolution than the MICR sensor. Thus, when reading the magnetic ink characters printed on the check, it is not easy for the MR sensor to extract a correct waveform on a per-character basis, unlike in the case of the character-based waveforms that are acquired through the MICR sensor in FIG. 2. However, the MR sensor may identify in similarity a basic type of the character-based waveform of each of the characters. Therefore, according to the present disclosure, character-based basic waveforms that are acquired through the MR sensor are categorized, by similarity in type, into a plurality of typical similarity waveforms. Accordingly, the plurality of typical similarity waveforms are used for comparison with the results of the OCR for verification.

In other words, as illustrated in FIG. 3, when the character-based waveforms of the magnetic ink characters that are acquired through a high-resolution MICR sensor in the related art are grouped by similarity in waveform that varies with the waveform factors, such as the number of peaks, the position of the peak, and the distance between the peaks, a waveform feature that commonly appears to be similar among the character-based waveforms belonging to the waveform group is present in each of the waveform groups. When a technique of grouping the characters by this waveform feature also applies in the same manner to the character-based waveforms that are acquired through the MR sensor, a distinctive difference is also present among groups of the character-based waveforms of the magnetic ink characters that are acquired with the MR sensor that has relatively lower resolution than the MICR sensor. Thus, although a magnetic ink character is recognized with the low-resolution MR sensor, it is possible to easily determine to which of wave groups the waveform of the recognized character belongs.

In this process of grouping by the waveform, as is the case with the magnetic ink characters printed in the E13B font, which are illustrated in FIG. 3, for example, grouping into five waveform groups is possible according to the waveform factors, such as the number of peaks, the position of the peak, and the distance between the peaks, which appear in each of the waveforms. Although not specifically described illustrated in an exemplary manner in the present embodiment, it is of course possible that, in a similar manner, the technique described above may also apply to a process of grouping by the waveform the magnetic ink characters, configured with ten numbers and five symbols, which are printed in the CMC7 font mostly used in Europe.

That is, in the present specification, in recognizing the magnetic ink characters through the MR sensor, the character-based waveforms of the magnetic ink characters are first acquired through the MR sensor, and, on the basis of the waveform factors of the acquired waveform, a microprocessor of the automated teller machine determines to which waveform group the acquired waveform belongs. For this process, the microprocessor is configured to execute a waveform authentication algorithm in such a manner as to determine to which waveform group the acquired waveform belongs, through the character-based waveforms of the magnetic ink characters that are acquired through the MR sensor.

In other words, the waveform authentication algorithm is configured in such a manner that the magnetic ink characters on the check that is inserted into the automated teller machine and goes through an authentication process by the authentication unit are recognized with the MR sensor and that which waveform group the character-based waveform belongs to is determined on the basis of the acquired character-based waveforms. An authentication reference for the waveform groups is performed in this manner through the waveform authentication algorithm. The authentication reference for the waveform groups may be established through a reiterative machine learning process on the basis of character-based waveform data of the MR sensor that are acquired on a per-character basis from a multiplicity of legitimate checks. For example, through the waveform authentication algorithm that finds application in the present embodiment, the authentication reference for the waveform groups to which the character-based waveforms being read belong is established by performing reiterative deep learning on the character-based waveform data of the MR sensor that are acquired on a per-character basis from the multiplicity of legitimate checks, using a Convolution Neural Network (CNN).

That is, in the present embodiment, the magnetic ink characters printed on the check inserted into the automated teller machine are recognized through the waveform authentication algorithm to be executed by the microprocessor of the automated teller machine by applying the authentication reference that is established through the machine learning as described above. The waveform authentication algorithm is configured in such a manner that, in the above-mentioned recognition process, which waveform group the acquired waveform belongs to is determined on the basis of the character-based waveforms of the magnetic ink characters that are acquired through the MR sensor, that results of the authentication are compared with the results of the OCR for verification, and thus that the magnetic ink characters are recognized. This process of recognizing the magnetic ink characters is described in more detail with reference to FIG. 4.

In addition, according to the present disclosure, in order to effectively improve the accuracy of the results of the group determination that is performed on a per-waveform basis through the waveform authentication algorithm to be executed by the microprocessor of the automated teller machine, the waveform authentication algorithm is configured in such a manner that data, such as the character-based waveforms of the magnetic ink characters and the waveform groups to which the waveforms belong, which are obtained while operating the automated teller machine, are stored in a database of the automated teller machine and that self-supervised learning, that is, reiterative machine learning, of these data is performed. With this configuration, the waveform authentication algorithm can continuously improve the accuracy of the waveform authentication by performing reiterative machine learning of the data that are obtained while operating the automated teller machine.

Figure 4:
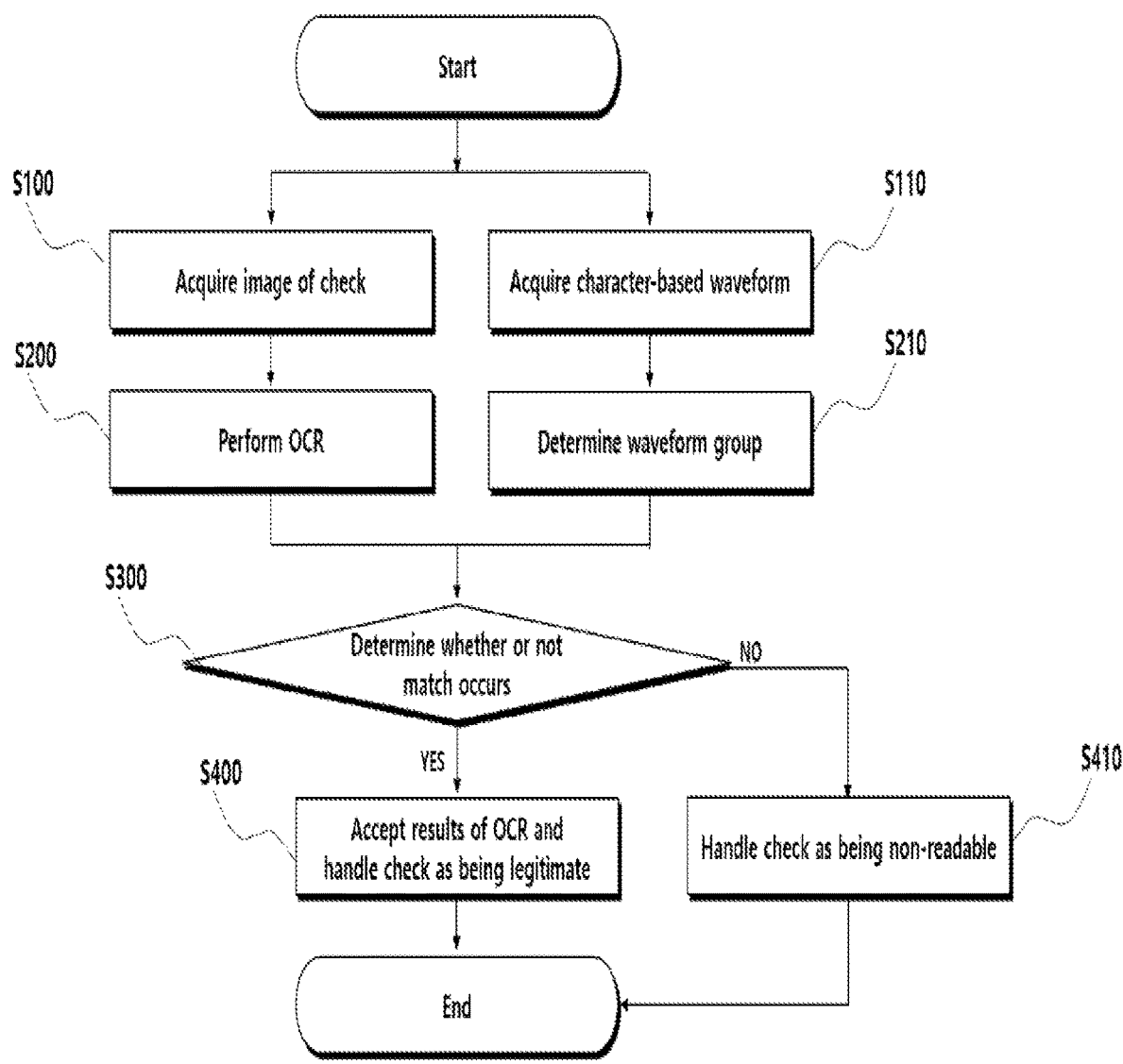
FIG. 4 is a flowchart illustrating a method of recognizing magnetic ink characters according to a second embodiment of the present disclosure.

FIG. 4 is a flowchart illustrating a method of recognizing magnetic ink characters according to a second embodiment of the present disclosure.

When a check is inserted into the automated teller machine, the check is transported to the authentication unit along a transportation path and goes through an authentication process. In this authentication process, in recognizing magnetic ink characters on the check, a process of recognizing the magnetic ink characters through the contact image sensor and a process of recognizing the magnetic ink characters through the MR sensor are performed together.

First, in the process of recognizing the magnetic ink characters through the contact image sensor, an image of the check is acquired by utilizing the contact image sensor (S100), and then the microprocessor of the automated teller machine reads the magnetic ink characters through the OCR technique on the basis of the acquired image of the check (S200), and thus, derives results of the OCR of the magnetic ink characters printed on the check.

In the process of recognizing the magnetic ink characters through the MR sensor, the magnetic ink characters printed on the check are first recognized with the MR sensor and then a character-based waveform of each of the individual magnetic ink characters is acquired (S110). Then, the microprocessor of the automated teller machine determines to which waveform group the acquired waveform belongs by applying the waveform authentication algorithm on the basis of the acquired character-based waveform information (S210).

Subsequently, a comparison verification process of determining whether or not results of OCR of the magnetic ink characters are matched with character-based waveform groups that result from the authentication through the waveform authentication algorithm (S300) is performed, and then the magnetic ink characters printed on the check are recognized. While this process is performed, it is checked whether or not each of the characters read as a result of the OCR performed by the microprocessor of the automated teller machine on the basis of the image of the check that is acquired through the contact image sensor belongs to the waveform group corresponding to each of the characters, which results from the authentication through the waveform authentication algorithm.

At this point, when it is checked that each of the characters that are read as a result of the OCR of the magnetic ink characters belongs to the waveform group that results from the authentication through the waveform authentication algorithm, it is determined that the OCR is properly performed, the results of the OCR are accepted, and then the check is handled as being legitimate (S400).

In contrast, in a case where the character-based waveform of the magnetic ink character read by the MR sensor is absent, or where each of the characters derived as a result of the OCR of the magnetic ink characters does not belong to the waveform group that results from the authentication through the waveform authentication algorithm, it is determined that a string of the magnetic ink characters printed on the check is simply a replicated one, that the check is a counterfeit check in which characters are printed in common ink instead of magnetic ink, or that a magnetic ink character that constitutes the string of the magnetic ink characters printed on the check is partially damaged. Consequently, the check is handled as being non-readable (S410). Then, a follow-up operation is performed, such as turning of the non-readable check back to the outside of the automated teller machine and storing of the non-readable check in a bill cassette separately provided in the automated teller machine.

With reference to FIG. 3, a specific example of the above-described process of recognizing the magnetic ink characters is described. When a check on one side of which magnetic ink characters "82347" are printed is inserted into the automated teller machine, in a process of authenticating the check, "82347" is derived as results of the OCR of an image acquired through the contact image sensor. As a result of recognizing the magnetic ink characters through the MR sensor and thus deriving the character-based waveforms, when the first character, the second character, the third character, the fourth character, and the last character that constitute the magnetic ink characters correspond to Group 1, Group 2, Group 3, Group 5, and Group 2, respectively, the automated teller machine determines that the OCR of the check is properly performed and accepts the results of the OCR.

In contrast, in a case where a value of the MR sensor is not output, it is determined that the check is a counterfeit check that results from replicating the string of the magnetic ink characters on the check or from using common ink instead of the magnetic ink, and thus the magnetic ink characters on the check are handled as being non-readable.

In addition, as in a case where the derived result is that a result of recognizing the first character constituting the magnetic ink characters corresponds to Group 4 or that a result of recognizing the last character corresponds to Group 1, in a case where each of the characters read as a result of the OCR does not belong to the waveform group that results from the authentication through the waveform authentication algorithm, it is determined that an error occurred in recognizing the magnetic ink characters on the check, and, as in the above-described case, the magnetic ink characters on the check are handled as being non-readable.

That is, in the method of recognizing magnetic ink characters according to the present disclosure, the image of the check and the character-based waveforms are acquired by driving both the contact image sensor and the MR sensor, respectively, that are provided in the authentication unit. A process for comparison for verification is performed in such a manner as to determine whether or not the results of the OCR that are derived by performing the OCR of the characters on the image of the check are matched with the character-based waveform groups that result from the authentication by applying the waveform authentication algorithm to the character-based waveforms of the magnetic ink characters. A configuration where the magnetic ink characters printed on the check are recognized through this process for the comparison for verification is employed. Therefore, the reliability of the results of the authentication of the check can be maintained by correctly recognizing the magnetic ink characters on the check without the high-resolution MICR sensor required to be provided in the automated teller machine in the related art in order to read the magnetic ink characters printed on the check.

As described above, the automated teller machine to which the method of recognizing magnetic ink characters according to the present disclosure is applied is configured in such a manner that, in the process of recognizing the magnetic ink characters printed on the check inserted into the automated teller machine handling both the bill and the check, the results of the OCR based on the image acquired through the contact image sensor are compared, for verification, with the character-based waveforms of the magnetic ink characters that are acquired through the MR sensor provided in order to authenticate whether or not the bill is legitimate and thus that the magnetic ink characters printed on the check are read. A structure of the authentication unit is simplified by not mounting the MICR sensor required to be provided in the authentication unit of the automated teller machine in the related art. Moreover, the cost of manufacturing the automated teller machine is effectively reduced.

The present disclosure is not limited to the embodiments that are described above with reference to the accompanying drawings. It would be apparent to a person of ordinary skill in the art to which the present disclosure pertains that various substitutions, modifications, and alterations are possible without departing from the technical idea of the present disclosure.

What is claimed is:

1. A method of recognizing magnetic ink characters, and the method comprising:
   obtaining character-based waveforms of magnetic ink characters on a check by a magnetoresistive (MR) sensor of an automated teller machine that handles bills and checks;
   obtaining a waveform group corresponding to each of the magnetic ink characters from a plurality of waveforms by executing a waveform authentication algorithm on a microprocessor of the automated teller machine to determine a waveform group to which each of the character-based waveforms corresponds according to a preset authentication reference for the waveform groups, based on each of the character-based waveforms acquired by recognizing the magnetic ink characters with the MR sensor, wherein the preset authentication reference for the waveform groups is derived through reiterative deep learning of character-based waveform data of the MR sensor that are acquired on a per-character basis from legitimate checks on each of which magnetic ink characters are properly printed, the reiterative deep learning using Convolution Neural Network (CNN);
   obtaining an image of the check by a contact image sensor of the automated teller machine;
   performing optical character recognition (OCR) on the obtained image by the microprocessor of the automated teller machine to obtain results of the OCR; and
   comparing, for verification, the results of the OCR and waveform groups of the magnetic ink characters.

2. The method of claim 1, wherein the check is determined to be legitimate responsive to the comparison indicating that each character read as a result of performing the OCR belongs to the waveform group corresponding to each character as determined by the waveform authentication algorithm.

3. The method of claim 1, wherein the check is determined to be non-readable responsive to the comparison indicating that each character read as a result of performing the OCR does not belong to the waveform group corresponding to each character as determined by the waveform authentication algorithm.

4. An automated teller machine comprising:
   a contact image sensor configured to capture an image of a check;
   a magnetoresistive (MR) sensor configured to obtain character-based waveforms of magnetic ink characters on the check; and
   a microprocessor configured to:
      obtain a waveform group corresponding to each of the magnetic ink characters from a plurality of waveforms, by applying a waveform authentication algorithm to determine a waveform group to which each of the character-based waveforms corresponds according to a preset authentication reference for the waveform groups, based on each of the character-based waveforms acquired by recognizing the magnetic ink characters with the MR sensor, wherein the preset authentication reference for the waveform groups is derived through reiterative deep learning of character-based waveform data of the MR sensor that are acquired on a per-character basis from legitimate checks on each of which magnetic ink characters are properly printed, the reiterative deep learning using Convolution Neural Network (CNN),
      perform optical character recognition (OCR) on the captured image to obtain results of the OCR, and
      compare, for verification, the results of the OCR and the waveform groups of the magnetic ink characters.

5. The automated teller machine of claim 4, wherein the check is determined to be legitimate responsive to the comparison indicating that the results of the OCR match the waveform groups of the magnetic ink characters.

6. The automated teller machine of claim 4, wherein the check is determined to be non-readable responsive to the comparison indicating that the results of the OCR derived do not match the waveform groups of the magnetic ink characters.

* * * * *